US008485293B2

(12) United States Patent
Wagner

(10) Patent No.: US 8,485,293 B2
(45) Date of Patent: Jul. 16, 2013

(54) HYBRID DRIVE HAVING EMERGENCY START CAPABILITY

(75) Inventor: Arndt Wagner, Eberdingennchingen (DE)

(73) Assignee: Robert Bosch GmbH, Stuttgart (DE)

( * ) Notice: Subject to any disclaimer, the term of this patent is extended or adjusted under 35 U.S.C. 154(b) by 994 days.

(21) Appl. No.: 12/225,847

(22) PCT Filed: Mar. 22, 2007

(86) PCT No.: PCT/EP2007/052745
§ 371 (c)(1),
(2), (4) Date: Aug. 26, 2009

(87) PCT Pub. No.: WO2007/115919
PCT Pub. Date: Oct. 18, 2007

(65) Prior Publication Data
US 2010/0000813 A1    Jan. 7, 2010

(30) Foreign Application Priority Data
Apr. 6, 2006  (DE) .................. 10 2006 016 138

(51) Int. Cl.
*B60W 10/00*    (2006.01)
(52) U.S. Cl.
USPC ........................ 180/65.265; 701/22
(58) Field of Classification Search
USPC ............ 180/65.265, 65.24, 65.27, 65.285, 180/65.29, 65.31, 65.8; 701/22; 477/167; 903/903, 930, 946; 307/10.1, 10.6; 318/139
See application file for complete search history.

(56) References Cited

U.S. PATENT DOCUMENTS

| | | | |
|---|---|---|---|
| 5,796,175 A * | 8/1998 | Itoh et al. | 307/10.1 |
| 6,098,584 A * | 8/2000 | Ahner et al. | 123/179.3 |
| 6,176,807 B1 * | 1/2001 | Oba et al. | 477/5 |
| 6,323,608 B1 * | 11/2001 | Ozawa | 318/139 |
| 6,335,574 B1 * | 1/2002 | Ochiai et al. | 290/40 C |
| 6,495,985 B1 * | 12/2002 | Mayes et al. | 318/701 |
| 6,765,306 B2 * | 7/2004 | Fattic | 290/40 C |
| 6,923,279 B2 * | 8/2005 | Shimane et al. | 180/65.1 |
| 7,176,659 B2 * | 2/2007 | Asao et al. | 322/28 |
| 7,266,441 B2 * | 9/2007 | Shim | 701/112 |
| 7,607,499 B2 * | 10/2009 | Egami | 180/65.265 |
| 8,039,976 B2 * | 10/2011 | Sato et al. | 290/40 C |
| 8,120,200 B2 * | 2/2012 | Walters et al. | 307/10.1 |
| 8,314,578 B2 * | 11/2012 | Namuduri et al. | 318/400.3 |

(Continued)

FOREIGN PATENT DOCUMENTS

| | | |
|---|---|---|
| DE | 517 870 | 2/1931 |
| DE | 568 272 | 1/1933 |

(Continued)

*Primary Examiner* — Katy M. Ebner
*Assistant Examiner* — Brodie Follman
(74) *Attorney, Agent, or Firm* — Kenyon & Kenyon LLP

(57) ABSTRACT

A method is provided for starting an internal combustion engine of a vehicle having a hybrid drive which includes at least one electric drive to which a high-voltage battery is assigned. If the high-voltage battery is discharged, an on-board electrical system battery of the vehicle is connected to a pulse-controlled inverter which activates the at least one electric drive; the at least one electric drive is accelerated load-free to a maximum rotational speed achievable at the applied voltage; the pulse-controlled inverter is disconnected from the on-board electrical system battery; and a clutch is engaged between the at least one electric drive and the internal combustion engine.

11 Claims, 1 Drawing Sheet

U.S. PATENT DOCUMENTS

| | | | |
|---|---|---|---|
| 2002/0179047 A1* | 12/2002 | Hoang et al. | 123/350 |
| 2003/0224902 A1* | 12/2003 | Kahlon et al. | 477/3 |
| 2005/0155803 A1 | 7/2005 | Schiele | |
| 2005/0211478 A1* | 9/2005 | Sakuma et al. | 180/65.1 |
| 2006/0249319 A1* | 11/2006 | Hoare et al. | 180/65.4 |
| 2007/0056784 A1* | 3/2007 | Joe et al. | 180/65.2 |
| 2007/0113814 A1* | 5/2007 | Tamai et al. | 123/179.3 |
| 2007/0157899 A1* | 7/2007 | Seufert et al. | 123/179.25 |
| 2007/0259755 A1* | 11/2007 | Tanishima | 477/3 |
| 2007/0276556 A1* | 11/2007 | Noel et al. | 701/22 |
| 2009/0286652 A1* | 11/2009 | Noel et al. | 477/167 |
| 2010/0225258 A1* | 9/2010 | Namuduri et al. | 318/400.3 |
| 2011/0309675 A1* | 12/2011 | Eger | 307/10.6 |
| 2012/0104845 A1* | 5/2012 | Pushkolli et al. | 307/10.1 |
| 2012/0122630 A1* | 5/2012 | Huber et al. | 477/5 |
| 2012/0193913 A1* | 8/2012 | Schweiggart et al. | 290/31 |

FOREIGN PATENT DOCUMENTS

| | | |
|---|---|---|
| DE | 197 45 995 | 9/1998 |
| DE | 199 56 384 | 11/2000 |
| EP | 0 989 300 | 3/2000 |
| EP | 1 450 037 | 8/2004 |
| JP | 6-101607 | 4/1994 |
| JP | 11-82253 | 3/1999 |
| JP | 11-318002 | 11/1999 |
| JP | 2001-025103 | 1/2001 |
| WO | WO 2005/005187 | 1/2005 |

* cited by examiner

HYBRID DRIVE HAVING EMERGENCY START CAPABILITY

BACKGROUND OF THE INVENTION

1. Field of the Invention

The present invention relates to a hybrid drive and a method for starting a hybrid drive.

2. Description of Related Art

An impulse start method and an impulse start device for an internal combustion engine are known from published German DE 199 56 384. According to the impulse start method described in DE 199 56 384, a flywheel mass is accelerated in a rotationally driven manner during an acceleration phase and the flywheel mass is subsequently coupled with a rotationally mounted shaft, preferably the crankshaft of the internal combustion engine, during a coupling phase for the purpose of transmitting torque. During the cranking phase and/or the coupling phase, the speed progression of the flywheel mass is evaluated, and this evaluation is used to determine whether the internal combustion engine may be successfully started. If a successful start is not to be expected, the internal combustion engine is placed via the shaft in an operating position which is favorable for a subsequent second start attempt. According to the impulse start method known from DE 199 56 384, the gradient of the speed progression of the flywheel mass is used during the cranking phase for the evaluation and, if the gradient is too low, the coupling phase is initiated.

In vehicles currently on the market having hybrid drives which include an internal combustion engine and at least one electric drive, there is no way for the driver to start the vehicle if the high-voltage battery is discharged. This is a highly unsatisfactory situation.

BRIEF SUMMARY OF THE INVENTION

An object of the present invention is to provide an economical option for starting a vehicle equipped with a hybrid drive, either via the vehicle battery feeding the on-board electrical system or externally.

According to the present invention, a method is described for connecting the on-board electrical system battery of the motor vehicle, which is generally a 12-volt battery, to the input of a pulse-controlled inverter, which is assigned to the at least one electric drive of the hybrid drive, and to activate this battery via a reduced voltage compared to normal operation. The at least one electric drive of the hybrid drive of the motor vehicle includes two clutches: one clutch to the internal combustion engine and one to the motor vehicle transmission. When activating the at least one electric drive at a reduced voltage, these two clutches are disengaged, enabling the at least one electric drive to be accelerated load-free to the maximum achievable rotational speed according to the charge level of the vehicle battery. A relay or another electrical contact, via which the 12-volt on-board electrical system battery is connected to the pulse-controlled inverter input instead of the discharged high-voltage battery, is switched back to its idle state and an impulse clutch is subsequently engaged between the accelerated at least one electric drive and the internal combustion engine. The mechanical energy stored in the rotating rotor of the at least one electric drive is transmitted via the impulse clutch to the internal combustion engine, preferably to its crankshaft, enabling the engine to be started. If the start attempt is unsuccessful, the entire process is repeatable, provided that the 12-volt on-board electrical system battery of the motor vehicle has a sufficient charge state.

The structure of the hybrid drive described according to the present invention is preferably designed in such a way that the 12-volt vehicle battery and the high-voltage battery are insulated from each other on all sides and no impermissibly high voltage peaks are fed from the at least one electric drive to the intact 12-volt on-board electrical system battery via the pulse-controlled inverter. The relay or the electrical contact switch in a different embodiment, via which the 12-volt battery is connected to the input pulse-controlled inverter if the high-voltage battery is discharged, is protected for this purpose by a control mimic in such a way that the relay is switchable only when the impulse clutch to the internal combustion engine is disengaged. The control mimic protecting the relay is characterized by the fact that it enables or suppresses a switching operation of the relay as a function of the state of the pulse-controlled inverter. For this purpose, the control mimic may be enabled, for example using a manual switch in the passenger compartment or one in the engine compartment, according to the driver's request. The control mimic protecting the relay may be designed separately as a switch system or also be assigned directly to the pulse-controlled inverter as a control element or also be implemented in any control unit.

The present invention also provides the option of externally starting the internal combustion engine of a vehicle equipped with a hybrid drive. If the high-voltage battery in the traction electrical system of the hybrid drive is discharged, the on-board electrical system battery provided in the on-board electrical system of the vehicle having the hybrid drive is connected to the inputs of the pulse-controlled inverter assigned to the at least one electric drive. If the on-board electrical system battery has an insufficient charge level, this battery is connectable to a booster battery or a booster vehicle via a jumper cable, and the at least one electric drive of the vehicle having a hybrid drive may be accelerated to a maximum achievable rotational speed via the booster vehicle or the booster battery. The on-board electrical system, including the on-board electrical system battery and the connected booster vehicle, are then disconnected on all sides from the pulse-controlled inverter. Once the maximum rotational speed has been reached, the fast-engaging impulse clutch is connected between the internal combustion engine and the accelerated, at least one electric drive of the hybrid drive. The internal combustion engine is cranked and finally started by the rotational energy of the rotor of the at least one electric drive. If the first start attempt is unsuccessful, the procedure may be repeated a number of times.

DETAILED DESCRIPTION OF THE INVENTION

Figure 1:
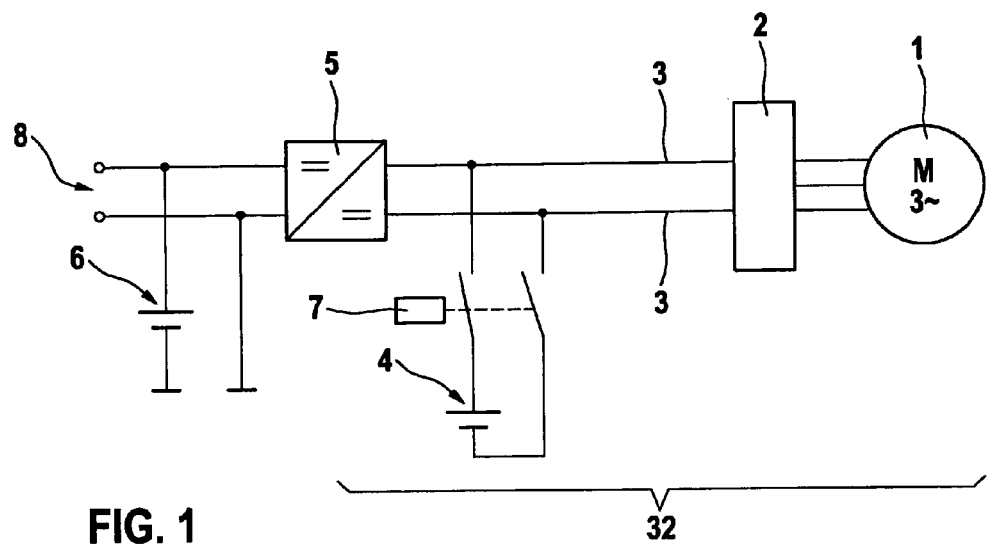
FIG. 1 shows a traction electrical system and an on-board electrical system of a vehicle having a hybrid drive.

FIG. 1 shows a traction electrical system and an on-board electrical system of a hybrid drive.

A hybrid drive includes at least one electric drive 1, e.g., a three phase (3~) electric drive 1, to which a pulse-controlled inverter 2 is assigned for activating the at least one electric drive 1. Pulse-controlled inverter 2 is connected to DC/DC converter 5 via supply lines 3. DC/DC converter 5 is provided with a unidirectional design. Via a high-voltage battery 4, which is also referred to as a traction battery, the at least one electric drive 1 is activated via pulse-controlled inverter 2 during normal operation with a closed main contactor 7. At the same time, voltage may be supplied to an on-board electrical system 8, which includes an on-board electrical system battery 6, from the traction electrical system, identified by reference numeral 32, of the hybrid drive. According to the circuit of pulse-controlled inverter 2 illustrated in FIG. 1, this inverter is continuously connected to high-voltage battery 4 (traction battery). Via unidirectionally operating DC/DC converter 5, voltage is supplied to on-board electrical system 8 and, if necessary, on-board electrical system battery 6 included in on-board electrical system 8 is charged from traction electrical system 32, depending on the operating state of the at least one electric drive 1. Energy is transportable via illustrated unidirectional DC/DC converter 5 from traction electrical system 32 to on-board electrical system 8, which may be either a 12-volt or a 42-volt electrical system. In a motor vehicle equipped with a hybrid drive, DC/DC converter 5 replaces the generator used in a conventional vehicle. The energy for the consumers in on-board electrical system 8 of the motor vehicle is provided via the at least one electric drive 1 by connecting pulse-controlled inverter 2 therebetween. The system described according to the present invention within a hybrid drive renders an energy flow from on-board electrical system 8 to traction electrical system 32 superfluous. According to the object of the present invention, it is also possible to avoid the use of a bidirectionally designed DC/DC converter, which is much more expensive than a unidirectionally operating DC/DC converter 5. The object of the present invention provides the option of starting an internal combustion engine from on-board electrical system battery 6 or to externally start the internal combustion engine via a booster vehicle without using a bidirectionally designed DC/DC converter.

Figure 2:
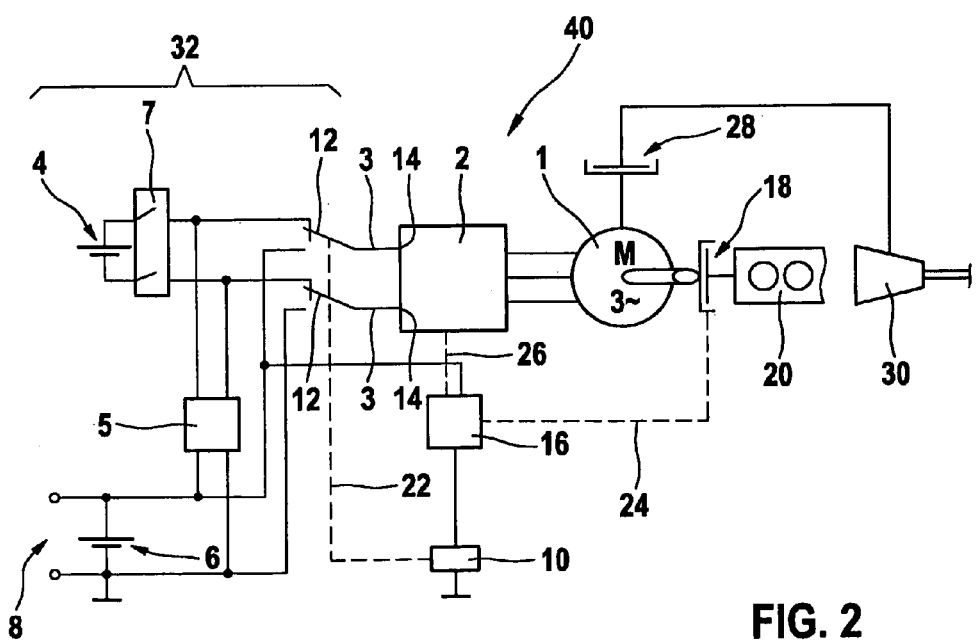
FIG. 2 shows the hybrid drive described according to the present invention, in which a relay is assigned to a pulse-controlled inverter via which the at least one electric drive of the hybrid drive is activated.

The illustration according to FIG. 2 shows a hybrid drive in which the pulse-controlled inverter is connectable on the input side to both a high-voltage battery and an on-board electrical system battery included in the on-board electrical system of the vehicle.

FIG. 2 shows a parallel hybrid drive 40, which includes an internal combustion engine 20 as well as at least one electric drive 1. In a manner similar to the illustration of the hybrid drive according to FIG. 1, electric drive 1 is activated via pulse-controlled inverter 2. Supply lines 3, on which, for example, relay contacts 12 are provided, end at inputs 14 of pulse-controlled inverter 2. Relay contacts 12 of supply lines 3 of pulse-controlled inverter 2 are switched via a relay 10, to which a control mimic 16 is assigned. Relay contacts 12 are actuated via monitored relay 10 using a mechanical clutch 22, which is indicated by the broken line in FIG. 2. According to the illustration in FIG. 2, high-voltage battery 4 (traction battery), upstream from which a main contactor 7 is connected, is located in hybrid drive 40. On-board electrical system 8 of the vehicle includes on-board electrical system battery 6, which may be a conventional 12-volt battery. Connected between high voltage battery 4 (traction battery) belonging to traction electrical system 32 and on-board electrical system 8 of the vehicle is a DC/DC converter 5, which is a unidirectional converter, via which on-board electrical system 8 and on-board electrical system battery 6 included therein are supplied with power according to the operating mode of the at least one electric drive 1. DC/DC converter 5 illustrated in FIG. 2 is preferably a unidirectionally operating converter which supplies only energy from traction electrical system 32 to on-board electrical system 8. The circuit illustrated in FIG. 2 renders the energy flow direction from on-board electrical system 8 to traction electrical system 32 obsolete.

The at least one electric drive 1 may be coupled with the crankshaft of internal combustion engine 20 via a fast-engaging clutch 18, which is preferably designed as an impulse clutch. The at least one electric drive 1 is also connected to a vehicle transmission 30, which is indicated here only schematically, via a further clutch 28.

Control mimic 16 assigned to relay 10 is connected on the one hand to pulse-controlled inverter 2 via a signal line 26, and is used to monitor the status of pulse-controlled inverter 2 assigned to the at least one electric drive 1. A signal line 24 also runs from control mimic 16 to fast-engaging clutch 18. Signal line 24 is used to monitor the position of clutch 18 between the at least one electric drive 1 and internal combustion engine 20 to determine the engaged and disengaged states.

Hybrid drive 40 described according to the present invention, which is a parallel hybrid drive in the described exemplary embodiment, enables internal combustion engine 20 to be started if high-voltage battery 4 (traction battery) is discharged. In this case, the relay contacts 12 are disconnected from high-voltage battery 4 (traction battery) and are connected to the lines running to on-board electrical system 8, including on-board electrical system battery 6 provided therein. Inputs 14 of pulse-controlled inverter 2 assigned to the at least one electric drive 1 are then connected to on-board electrical system battery 6 of on-board electrical system 8 via supply lines 3. Since only a low voltage may be drawn from on-board electrical system 8, depending on the charge state of on-board electrical system battery 6, the at least one electric drive 1 is accelerated to the maximum rotational speed achievable at the available voltage level when clutch 18 is disengaged between the at least one electric drive 1 and internal combustion engine 20 to be started. In this case, additional clutch 28 to vehicle transmission 30 is also disengaged so that the at least one electric drive 1 may be accelerated load-free.

Inputs 14 of pulse-controlled inverter 2 are connectable to electrical lines running to on-board electrical system 8 via relay 10 having relay contacts 12 only if it is determined via signal line 24 that clutch 18 is disengaged between the at least one electric drive 1 and internal combustion engine 20 to be started. Control mimic 16 is also used to query the status of pulse-controlled inverter 2 activating the at least one electric drive 1 to prevent impermissibly high voltage peaks from reaching on-board electrical system 8 of the vehicle and damaging on-board electrical system battery 6 included therein.

Once the at least one electric drive 1 has reached its maximum achievable rotational speed, relay contacts 12 are disconnected from on-board electrical system 8 via relay 10, and fast-engaging clutch 18 is engaged between accelerated electric drive 1 and internal combustion engine 20 to be started. The rotational energy stored in the rotor of the at least one electric drive 1 is then transmitted to the crankshaft of internal combustion engine 20, which may be started. Depending on the charge state of on-board electrical system battery 6 of on-board electrical system 8 of the vehicle, the start operation may be repeated a number of times.

If on-board electrical system battery 6 in on-board electrical system 8 of the vehicle is discharged to the extent that internal combustion engine 20 is unable to be started, the internal combustion engine is connectable to a booster battery or a booster vehicle via a jumper cable, enabling the at least one electric drive 1 to be started via pulse-controlled inverter 2, supply lines 3 and on-board electrical system battery 6 connected to a booster battery or a booster vehicle via the jumper cable. In this case, supply lines 3 are disconnected from the lines of high-voltage battery 4 (traction battery).

In the case of hybrid drive 40 illustrated in FIG. 2, which is a parallel hybrid drive, on-board electrical system battery 6 of on-board electrical system 8 and high-voltage battery 4 (traction battery) are completely insulated from one another. Control mimic 16 ensures that no impermissibly high voltages are induced in on-board electrical system battery 6 by the at least one electric drive 1. Switching conditions of relay 10, which acts upon relay contacts 12, are stored in control mimic 16. The latter ensures that relay 10 is enabled for switching only if this is permitted by the status of pulse-controlled inverter 2. States in which pulse-controlled inverter 2 prevents relay 10 from switching are, on the one hand, an excessively high voltage at input terminals 14 of pulse-controlled inverter 2, which may occur as a result of a still charged capacitor within pulse-controlled inverter 2, and, on the other hand, an error state in pulse-controlled inverter 2. Via control mimic 16, switching of relay 10 may be enabled if desired by a driver's request, transmitted for example by actuating a manual switch in the passenger compartment or engine compartment. Control mimic 16 may be implemented separately by switches; control mimic 16 may also be integrated directly within pulse-controlled inverter 2. It is also possible to implement control mimic 16 via a separate control unit. Hybrid drive 40 illustrated in FIG. 2 includes an internal combustion engine 20 as well as an electric drive 1. Instead of an electric drive 1 illustrated in FIG. 2, to which pulse-controlled inverter 2 is assigned, hybrid drive 40 may also include multiple electric drives to each of which a separate pulse-controlled inverter is assigned. In the case of a hybrid drive 40 having multiple electric drives, pulse-controlled inverters 2 thereof may also be integrated into a separate control unit.

What is claimed is:

1. A method for starting an internal combustion engine of a vehicle having a hybrid drive, the hybrid drive including at least one electric drive to which a high-voltage battery is assigned, and the vehicle having an on-board electrical system including an on-board electrical system battery, the method comprising:
   a) if the high-voltage battery is discharged, connecting the on-board electrical system battery to a pulse-controlled inverter activating the at least one electric drive;
   b) accelerating the at least one electric drive load-free to a maximum rotational speed achievable at the applied voltage; and
   c) disconnecting the pulse-controlled inverter from the on-board electrical system battery, and engaging a clutch between the at least one electric drive and the internal combustion engine.

2. The method as recited in claim 1, wherein one of the on-board electrical system battery or the high-voltage battery is connected to inputs of the pulse-controlled inverter via a relay.

3. The method as recited in claim 2, wherein the relay is monitored by a control mimic monitoring the status of the pulse-controlled inverter and the status of the clutch.

4. The method as recited in claim 1, wherein step a) is carried out only when the clutch is disengaged.

5. The method as recited in claim 1, wherein, after the internal combustion engine has been started, the high-voltage battery is charged via the at least one electric drive and the pulse-controlled inverter.

6. The method as recited in claim 2, wherein the relay is configured to be switched based upon a driver request.

7. The method as recited in claim 1, wherein, according to step a), the internal combustion engine is started via a jumper cable connected to the on-board electrical system battery and to one of a booster battery or a booster vehicle.

8. A hybrid drive for a vehicle, comprising:
   an internal combustion engine;
   at least one electric drive to which a pulse-controlled inverter is assigned;
   an on-board electrical system battery;
   a high-voltage battery;
   at least one clutch between the internal combustion engine and the at least one electric drive; and
   a relay electrically connecting inputs of the at least one pulse-controlled inverter for the at least one electric drive to one of the high-voltage battery or the on-board electrical system battery, wherein the relay is assigned a control mimic monitoring the status of the pulse-controlled inverter and the status of the at least one clutch.

9. The hybrid drive as recited in claim 8, wherein the relay is configured to be actuated via a switch situated in one of a passenger compartment or an engine compartment of the vehicle.

10. The hybrid drive as recited in claim 8, wherein the at least one clutch is configured as a fast-engaging impulse clutch.

11. An arrangement for starting an internal combustion engine of a vehicle, the engine including a hybrid drive, the hybrid drive including at least one electric drive to which a high-voltage battery is assigned, and the vehicle including an on-board electrical system including an on-board electrical system battery, the arrangement comprising:
   hardware circuitry configured to:
   a) if the high-voltage battery is discharged, connect the on-board electrical system battery to a pulse-controlled inverter activating the at least one electric drive;
   b) accelerate the at least one electric drive load-free to a maximum rotational speed achievable at the applied voltage; and
   c) disconnect the pulse-controlled inverter from the on-board electrical system battery, and engage a clutch between the at least one electric drive and the internal combustion engine.

* * * * *

UNITED STATES PATENT AND TRADEMARK OFFICE
CERTIFICATE OF CORRECTION

PATENT NO. : 8,485,293 B2
APPLICATION NO. : 12/225847
DATED : July 16, 2013
INVENTOR(S) : Arndt Wagner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1319 days.

Signed and Sealed this
Eighth Day of September, 2015

Michelle K. Lee
*Director of the United States Patent and Trademark Office*